(12) United States Patent
Kim et al.

(10) Patent No.: US 12,534,003 B2
(45) Date of Patent: Jan. 27, 2026

(54) VENTILATION DUCT DEVICE FOR VEHICLE SEAT

(71) Applicants: Hyundai Motor Company, Seoul (KR); Kia Corporation, Seoul (KR); KBAUTOTECH CO., LTD, Anyang-si (KR)

(72) Inventors: Mu Young Kim, Osan-si (KR); Sang Do Park, Seoul (KR); Ho Suk Jung, Hwaseong-si (KR); Chan Ho Jung, Gunpo-si (KR); Jun Young Yun, Osan-si (KR); Tae Soo Sung, Anyang-si (KR); Yong Jun Jo, Anyang-si (KR); Ho Chang Jin, Daegu (KR)

(73) Assignees: Hyundai Motor Company, Seoul (KR); Kia Corporation, Seoul (KR); KBAUTOTECH CO., LTD, Asan-si (KR)

( * ) Notice: Subject to any disclaimer, the term of this patent is extended or adjusted under 35 U.S.C. 154(b) by 177 days.

(21) Appl. No.: 18/529,103

(22) Filed: Dec. 5, 2023

(65) Prior Publication Data

US 2024/0367561 A1 Nov. 7, 2024

(30) Foreign Application Priority Data

May 3, 2023 (KR) .......................... 10-2023-0057946

(51) Int. Cl.
*B60N 2/56* (2006.01)

(52) U.S. Cl.
CPC .................................. *B60N 2/5621* (2013.01)

(58) Field of Classification Search
CPC .................................................... B60N 2/5621
See application file for complete search history.

(56) References Cited

U.S. PATENT DOCUMENTS

| | | | | |
|---|---|---|---|---|
| 6,179,706 B1* | 1/2001 | Yoshinori | ............ | B60N 2/5657 |
| | | | | 297/180.14 |
| 10,384,575 B2* | 8/2019 | Yu | ......... | B60N 2/667 |
| 11,161,438 B2* | 11/2021 | Won | .................... | B60N 2/5657 |
| 11,203,277 B1* | 12/2021 | Yu | ........ | B60N 2/5657 |
| 11,279,272 B2* | 3/2022 | Hoshi | ...................... | A47C 7/74 |
| 11,325,510 B2* | 5/2022 | Arata | .................... | B60N 2/565 |
| 12,221,022 B2* | 2/2025 | Lim | ......... | B60N 2/22 |
| 12,304,371 B2* | 5/2025 | Kim | .................... | B60N 2/5657 |
| 2015/0140915 A1* | 5/2015 | Rawlinson | ........... | B60N 2/5621 |
| | | | | 454/120 |
| 2018/0065525 A1* | 3/2018 | Higashihara | ......... | B60N 2/5657 |

* cited by examiner

*Primary Examiner* — Philip F Gabler
(74) *Attorney, Agent, or Firm* — Slater Matsil, LLP

(57) ABSTRACT

In an embodiment, a ventilation duct device for a vehicle seat, includes a cushion duct, a blower coupled to the cushion duct, configured for air exiting the blower to enter the cushion duct, a back duct, a corrugated pipe, configured for air exiting the blower to enter the back duct via the corrugated pipe, an elastic support unit coupled to and at least partially located within the corrugated pipe, a first end of the elastic support unit coupled to the cushion duct, a second end of the elastic support unit coupled to the back duct, and a spring member coupled between the first end of the elastic support unit and the second end of the elastic support unit, and the spring member being at least partially located within the corrugated pipe.

14 Claims, 6 Drawing Sheets

VENTILATION DUCT DEVICE FOR VEHICLE SEAT

CROSS-REFERENCE TO RELATED APPLICATIONS

This application claims the benefit of Korean Patent Application No. 10-2023-0057946, filed on May 3, 2023, which application is hereby incorporated herein by reference.

TECHNICAL FIELD

The present disclosure relates to a ventilation duct device for a vehicle seat.

BACKGROUND

In general, a vehicle seat is provided with a ventilation duct device that supplies air to a seat cushion and a seatback through a blower so that the back and buttocks of a user seated on the seat are prevented from becoming wet with sweat.

Among accompanying drawings, FIG. 6 is a view showing a conventional ventilation duct device, and FIG. 7 shows views showing problems occurring when applying the conventional ventilation duct device to a folding seat.

As shown in FIGS. 6 and 7, the conventional ventilation duct device has one blower 3 located on a lower side of a seat cushion 6 and is configured to supply air sucked by the blower 3 to the seat cushion 6 and seatback 2 passing through a cushion duct 4 and a back duct 5, respectively. Such a ventilation duct device has an advantage of directly delivering cool air supplied from an air conditioner to the back and buttocks of a user.

However, as shown in FIG. 7, in the case of a folding seat in which the seatback 7 is rotatably configured toward the seat cushion 6, a distance between the back duct 5 and the cushion duct 4 increases considerably when the seatback 7 rotates, so the ventilation duct device using one blower 3 as described above may not be used.

Accordingly, a ventilation duct device using two blowers mounted on a seatback and a seat cushion, respectively, is applied to the conventional folding seat.

However, the ventilation duct device using two blowers has problems in that manufacturing cost increases and the comfort performance of the seatback decreases due to the application of a separate blower to the seatback.

The foregoing is intended merely to aid in the understanding of the background of the present disclosure and is not intended to mean that the present disclosure falls within the purview of the related art that is already known to those skilled in the art.

SUMMARY

Embodiments of the present disclosure relate to a ventilation duct device for a vehicle seat that allows air to be transferred to a seatback and a seat cushion of a vehicle seat.

Accordingly, the present disclosure has been made keeping in mind the above problems occurring in the related art, and embodiments of the present disclosure can provide a ventilation duct device for a vehicle seat configured to supply air to a seatback and a seat cushion using one blower even when the distance between a cushion duct and a back duct increases due to rotation of the seatback.

Advantages of embodiments of the present disclosure are not limited to the advantages explicitly discussed herein, and other advantages will be clearly understood by those skilled in the art from the following description.

An embodiment of a ventilation duct device for a vehicle seat can include a cushion duct provided with a blower at a central portion thereof and having a front end portion connected to a seat cushion to transfer air supplied through the blower to the seat cushion. The ventilation duct device can include a back duct connected to a rear end portion of the cushion duct and a seatback to supply air transferred through the rear end portion of the cushion duct to the seatback. The ventilation duct device can include a corrugated pipe configured to be extendable and restorable between the rear end portion of the cushion duct and the back duct to connect the cushion duct and the back duct to allow air to be able to be communicated therewith. And, the ventilation duct device can include an elastic support unit connecting the corrugated pipe to the cushion duct and the back duct and assisting in restoring the corrugated pipe by elastic restoring force of the elastic support unit when the corrugated pipe is restored.

According to an embodiment of the present disclosure, the elastic support unit can include a front holder member coupled between the cushion duct and the corrugated pipe. An embodiment can include a rear holder member coupled between the back duct and the corrugated pipe. And, an embodiment can include a plurality of spring members connected between the front holder member and the rear holder member and disposed in an inner space of the corrugated pipe.

The front holder member can include a front holder body connected between the rear end portion of the cushion duct and a front end portion of the corrugated pipe. The front holder member can include a plurality of front coupling plates provided spaced apart from each other inside the front holder body and respectively coupled to front end portions of the spring members.

In addition, the front holder body can include, at a front end portion thereof, a cushion duct locking protrusion to be assembled to the rear end portion of the cushion duct and, at a rear end portion thereof, with a front corrugated tube locking protrusion to be assembled to the front end portion of the corrugated pipe.

In addition, the front coupling plates can include front spring latches to which the front end portions of the spring members can be respectively coupled.

In addition, the rear holder member can include a rear holder body connected between a front end portion of the back duct and a rear end portion of the corrugated pipe, and a plurality of rear coupling plates spaced apart from each other inside the rear holder body and respectively coupled to rear end portions of the spring members.

In addition, the rear holder body can include, at a rear end portion thereof, a back duct locking protrusion to be assembled to the front end portion of the back duct, and, at a front end portion thereof, a rear corrugated pipe locking protrusion, which can be assembled and fixed to the rear end portion of the corrugated pipe.

In addition, the rear coupling plates can include rear spring latches to which the rear end portions of the spring members can be respectively coupled.

Embodiments of the present disclosure can provides the following effects.

First, the ventilation duct device of an embodiment of the present disclosure can stably maintain the connection between the cushion duct and the back duct even when the seatback rotates by using a corrugated pipe having a variable length and an elastic support unit for assisting the operation of the corrugated pipe. Therefore, the ventilation duct device of an embodiment of the present disclosure can be applied to folding seats even without adding a separate blower to the seatback, and cost reduction is possible as the number of blowers can be reduced.

Second, in the ventilation duct device of an embodiment of the present disclosure, a blower for the seatback need not be applied, whereby the comfort performance of the seatback can be improved, and cool air can be supplied to the seatback through the blower mounted on the seat cushion, whereby it can be increased the cooling performance of the seatback.

Effects of an embodiment of the present disclosure are not limited to the effects mentioned above, and other effects of an embodiment of the present disclosure that are not mentioned can be clearly understood by those skilled in the art from the following description.

BRIEF DESCRIPTION OF THE DRAWINGS

The above and other features and other advantages of embodiments of the present disclosure can be more clearly understood from the following detailed description when taken in conjunction with the accompanying drawings, in which.

DETAILED DESCRIPTION OF ILLUSTRATIVE EMBODIMENTS

Specific structural and/or functional descriptions presented in the embodiments of the present disclosure are merely exemplified for the purpose of explaining embodiments according to the concept of the present disclosure, and embodiments according to the concept of the present disclosure can be implemented in various forms.

In addition, throughout the present specification, when a certain part "includes" a certain component, it means that it can further include other components rather than excluding other components unless otherwise stated.

In the present disclosure, terms such as "first" and/or "second" can be used to describe various elements, but the elements are not necessarily limited to the above terms. Such terms can be only used for the purpose of distinguishing one element from other elements. For example, within a range not departing from the scope of rights according to concepts of the present disclosure, a first element can be named a second element, and similarly, a second element can be named a first element.

When a component is referred to as being "connected" or "coupled" to another element, it should be understood that although it can be directly connected or coupled to another element, other elements can exist in the middle. On the other hand, when an element is referred to as being "directly connected" or "directly coupled" to another element, it should be understood that no other element exists in the middle.

Hereinafter, embodiments of the present disclosure will be described with reference to the accompanying drawings. Matters represented in the accompanying drawings are drawings schematically illustrated to easily explain the embodiments of the present disclosure and can be different from those actually implemented.

Figure 1:
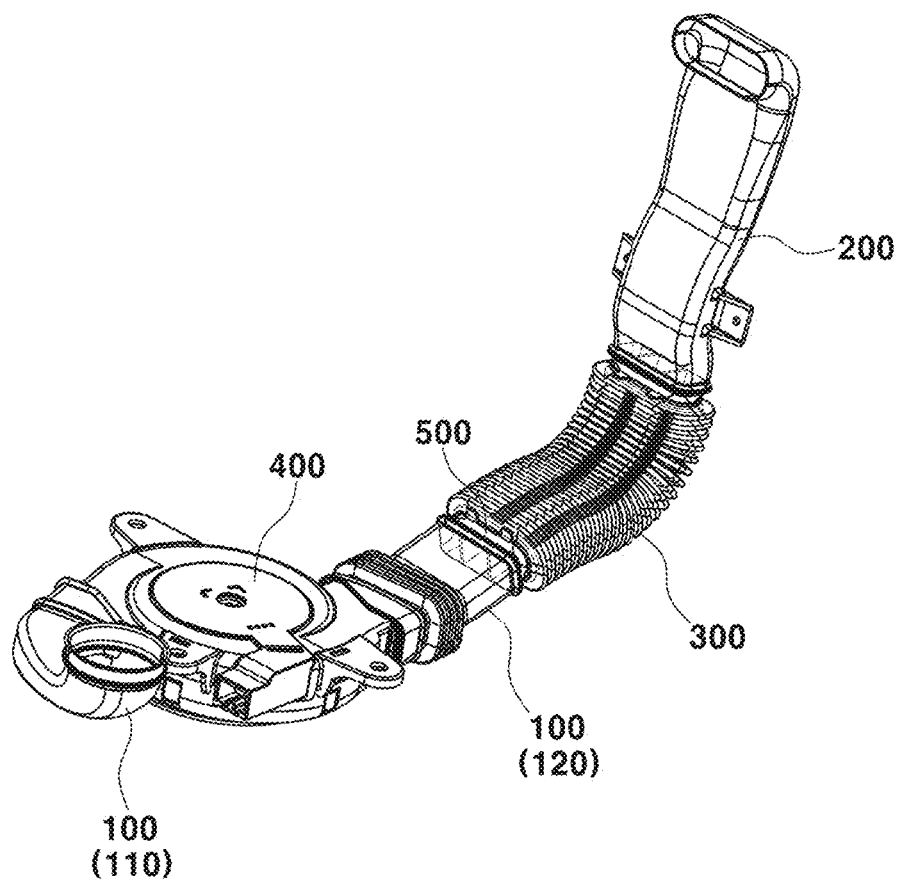
FIG. 1 is an assembled perspective view showing a ventilation duct device for a vehicle seat according to an embodiment of the present disclosure.
Figure 2:
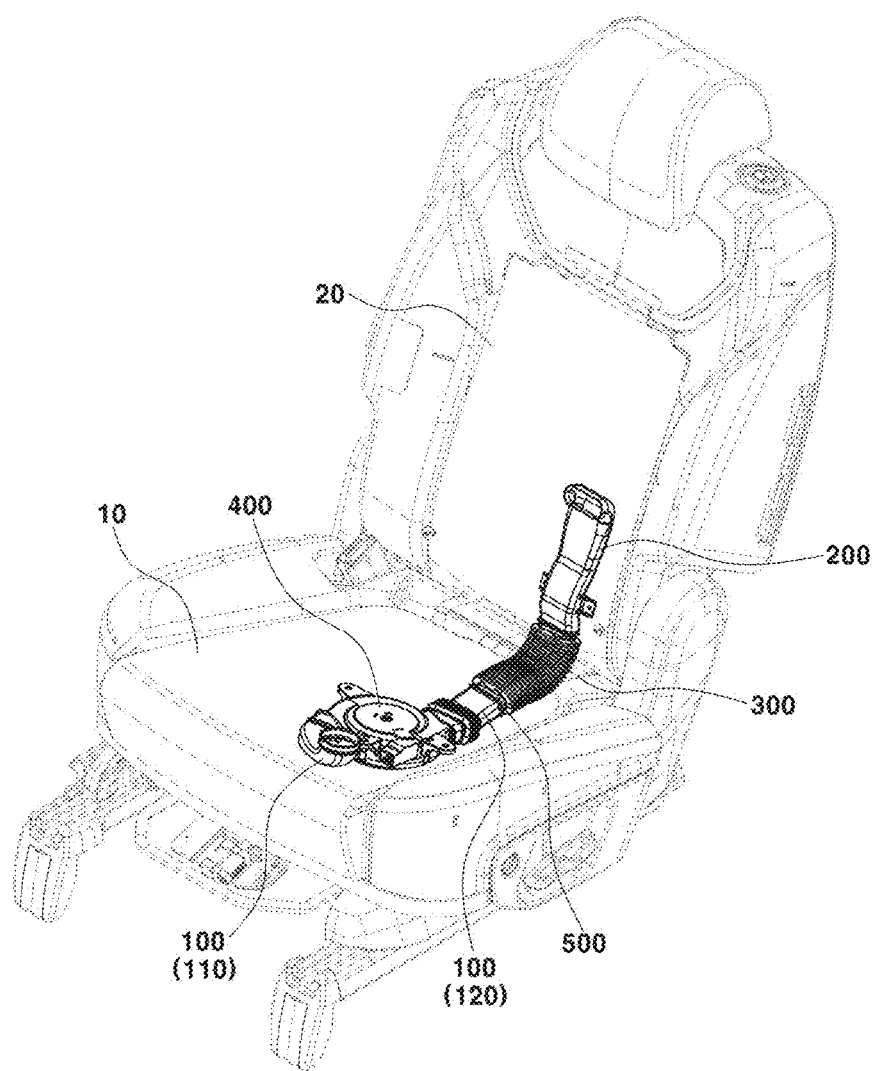
FIG. 2 is a view showing a state in which the ventilation duct device for a vehicle seat according to an embodiment of the present disclosure can be mounted on the vehicle seat.
Figure 3:
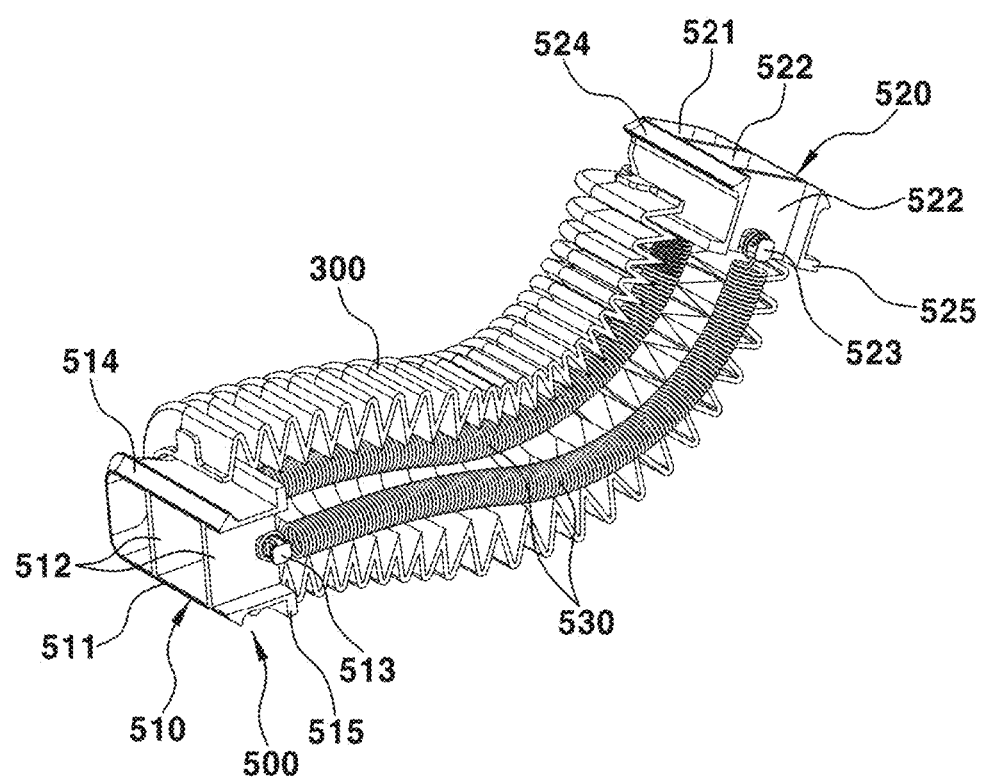
FIG. 3 is a partially cut-away view of some configurations of the ventilation duct device for a vehicle seat according to an embodiment of the present disclosure.
Figure 4:
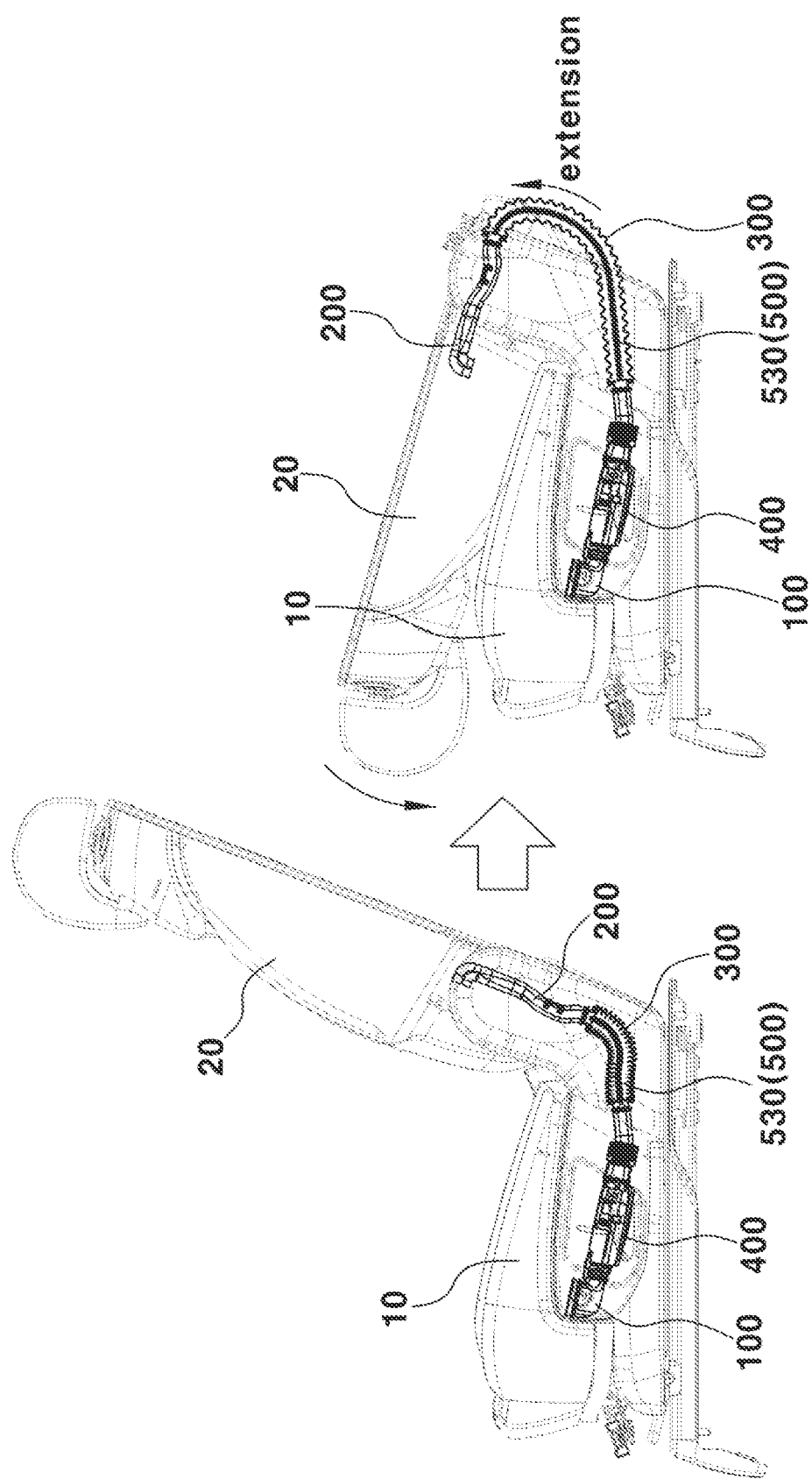
FIGS. 4 and 5 show views showing operating states of the ventilation duct device for a vehicle seat according to an embodiment of the present disclosure.
Figure 5:
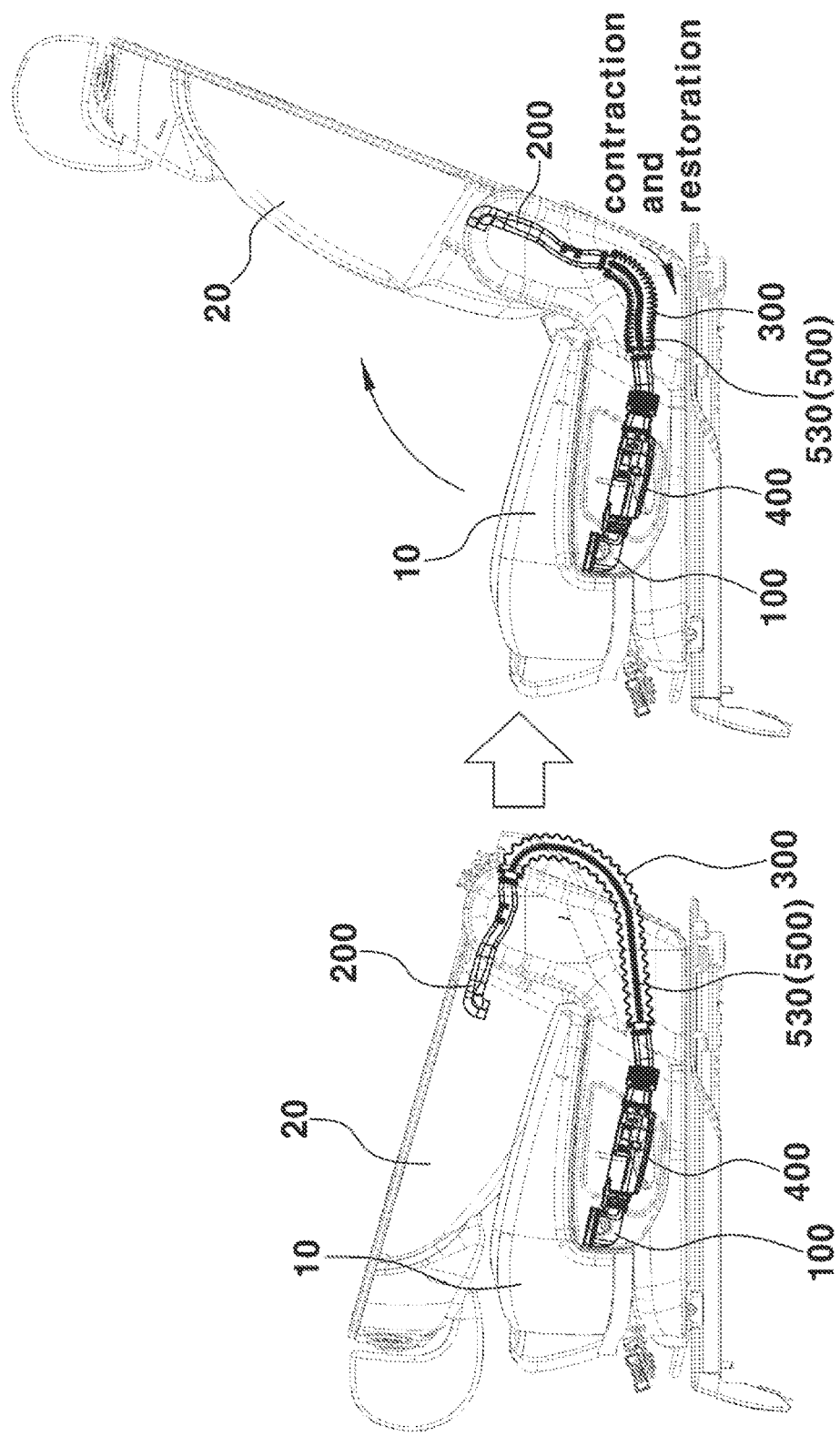
Figure 6:
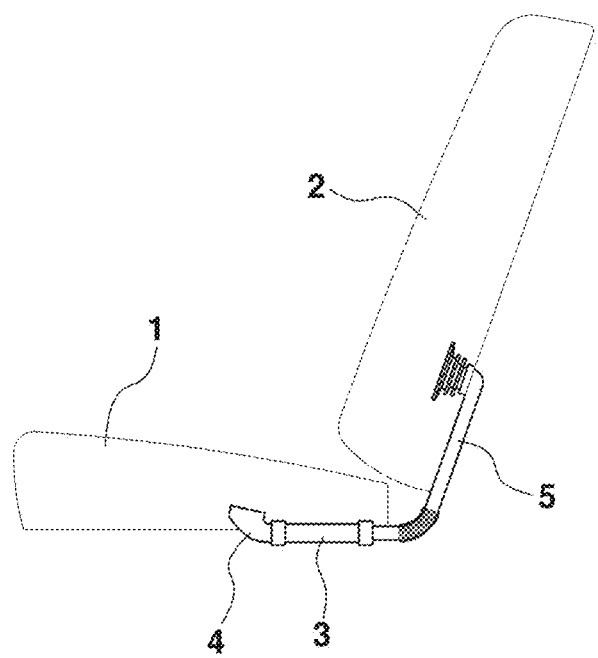
FIG. 6 is a view showing a conventional ventilation duct device.
Figure 7:
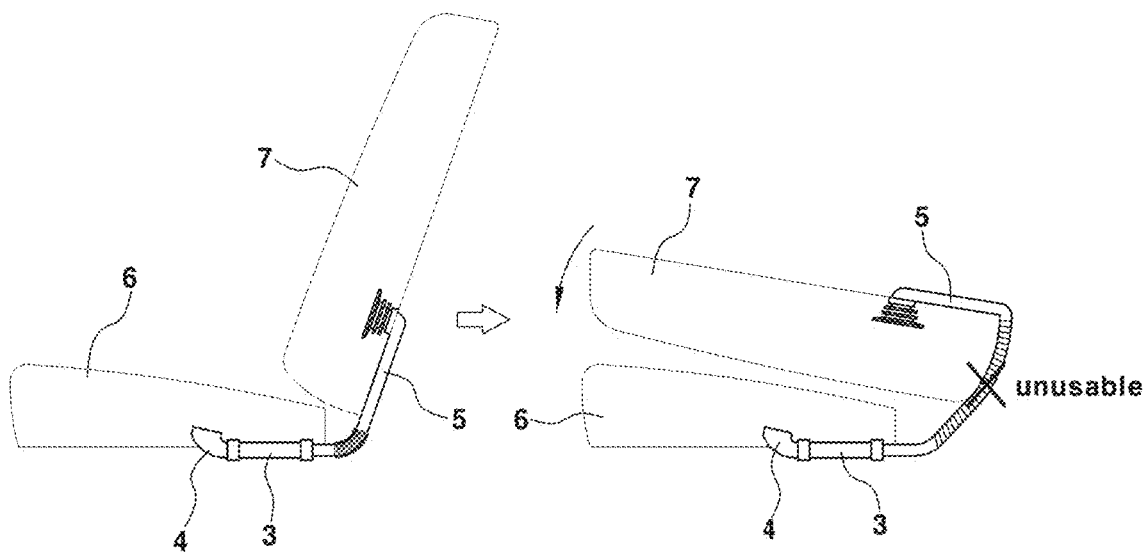
FIG. 7 shows views showing problems occurring when applying the conventional ventilation duct device to a folding seat.

FIG. 1 is an assembled perspective view showing a ventilation duct device for a vehicle seat according to an embodiment of the present disclosure. FIG. 2 is a view showing a state in which the ventilation duct device for a vehicle seat according to an embodiment of the present disclosure is mounted on the vehicle seat. FIG. 3 is a partially cut-away view of some configurations of the ventilation duct device for a vehicle seat according to an embodiment of the present disclosure. FIGS. 4 and 5 show views showing operating states of the ventilation duct device for a vehicle seat according to an embodiment of the present disclosure.

As shown in FIGS. 1 and 2, the ventilation duct device for a vehicle seat according to an embodiment of the present disclosure includes a cushion duct 100 connected to a seat cushion 10, a back duct 200 connected to a seatback 20, a blower 400 provided in a central portion of the cushion duct 100, a corrugated pipe 300 provided between the cushion duct 100 and the back duct 200.

The cushion duct 100 can be provided with the blower 400 at the central portion thereof in the longitudinal direction and can be configured to deliver air supplied through the blower 400 to the seat cushion 10.

Specifically, one side end portion of the cushion duct 100 in the longitudinal direction can be connected to a lower side of the seat cushion 10 to allow air to be communicated therewith, and an opposite side end portion in the longitudinal direction can be connected to the back duct 200. The opposite side end portion of the cushion duct 100 can be connected to the back duct 200 through the corrugated pipe 300.

Such a cushion duct 100 can include a cushion discharge duct 110 and a connection duct 120. The cushion discharge duct 110 can be connected between the blower 400 and the seat cushion 10 to deliver the air supplied through the blower 400 to the seat cushion 10, and the connection duct 120 can be connected between the blower 400 and the corrugated pipe 300 to deliver the air supplied through the blower 400 to the corrugated pipe 300.

One side end portion and the opposite side end portion of the cushion duct 100 can also be referred to as a front end portion and a rear end portion, respectively, and in this case, directions such as front and rear are based on the vehicle or seat.

The blower 400 can be connected to an air conditioner (or referred to as an "air conditioning device") of a vehicle to suck in cool air generated by the air conditioner. The blower 400 can blow air sucked from the air conditioner to the cushion duct 100 and the back duct 200. The air conditioner can be an air conditioner generally installed in vehicles.

The back duct 200 can have one side end portion in the longitudinal direction connected to a rear part of the seatback 20 to allow air to be communicated therewith and an opposite side end portion in the longitudinal direction can be connected to the cushion duct 100 to allow air to be communicated therewith. The back duct 200 can be connected to the cushion duct 100 through the corrugated pipe 300.

The corrugated pipe 300 can be configured to be extendable and restorable between the cushion duct 100 and the back duct 200. When the corrugated pipe 300 is pulled from one side or opposite sides in its longitudinal direction, its length is extended. For example, when the seatback 20 is rotated toward the seat cushion 10, the corrugated tube 300 is extended. When the pulling force is removed, the length of the corrugated pipe 300 is reduced and the corrugated pipe 300 is restored to its original state. One side end portion of the corrugated pipe 300 in the longitudinal direction can be connected to the rear end portion of the cushion duct 100, and an opposite side end portion in the longitudinal direction can be connected to a lower side end portion of the back duct 200. In other words, opposite end portions of the corrugated pipe 300 can be connected to the rear end portion of the cushion duct 100 and the front end portion of the back duct 200, respectively. Here, directions such as front and rear, left and right, and up and down are based on a vehicle or seat unless otherwise specified.

The corrugated tube 300 can be bent in a form surrounding the rear end portion of the seat cushion 10. For example, when the seatback 20 is in a basic state in which it is not rotated forward or backward (refer to the left drawing of FIG. 4), the corrugated tube 300 can surround the rear end portion of the seat cushion 10 in an approximately L shape. When the seatback 20 is rotated forward in the basic state and folded toward the seat cushion 10, the corrugated pipe 300 can be more bent than when the seatback 20 is in the basic state. In addition, when the seatback 20 is rotated backward and bent in the basic state, the corrugated pipe 300 can be bent less than when the seatback 20 is in the basic state. In addition, when the seatback 20 is rotated rearward from the basic state, the corrugated tube 300 can be compressed in its longitudinal direction.

The corrugated pipe 300 can be made of a rubber material so as to be easily extended and restored in its longitudinal direction. The corrugated tube 300 can be flexibly extended or restored according to the rotational angle of the seatback 20. The corrugated pipe 300 has fluidity, so phenomena such as sagging and bending thereof can occur during contraction and restoration thereof, as its length increases.

As shown in FIG. 3, to prevent the above phenomenon, the ventilation duct device of an embodiment of the present disclosure can use an elastic support unit 500 to maintain the corrugated pipe 300 in a length corresponding to the rotational angle of the seatback 20, and, at the same time, to allow the reliability and operational stability of the corrugated pipe 300 to be ensured/improved.

The elastic support unit 500 can be configured to connect the corrugated pipe 300 to the cushion duct 100 and the back duct 200 and to assist in restoring the corrugated pipe 300 by elastic restoring force of the elastic support unit 500 when the corrugated pipe 300 is restored. The elastic support unit 500 is configured to pull the corrugated pipe 300 in a contraction direction (or a restoration direction) when the corrugated pipe 300 is restored.

As shown in FIG. 3, the elastic support unit 500 can be connected to the cushion duct 100 and the back duct 200 in a state of penetrating the inner space of the corrugated pipe 300 and can be located in the inner space of the corrugated pipe 300.

Specifically, the elastic support unit 500 can include a front holder member 510, a rear holder member 520, and at least two spring members 530.

The front holder member 510 can be coupled between the cushion duct 100 and the corrugated pipe 300. In other words, the front holder member 510 can be coupled to the rear end portion of the cushion duct 100 and the front end portion of the corrugated pipe 300.

Specifically, the front holder member 510 can include a front holder body 511 and at least two front coupling plates 512 spaced apart from each other at an inner side of the front holder body 511.

The front holder body 511 can be provided with a hollow pipe structure that is airtightly connected between the rear end portion of the cushion duct 100 and the front end portion of the corrugated pipe 300. The front holder body 511 can be provided, at a front end portion thereof, with a cushion duct locking protrusion 514 that can be assembled and fixed to the rear end portion of the cushion duct 100. In addition, the front holder body 511 can be provided, at a rear end portion thereof, with a front corrugated pipe locking protrusion 515 that can be assembled and fixed to the front end portion of the corrugated pipe 300.

The front coupling plates 512 can be provided with longitudinal end portions (that is, front end portions) of the spring members 530 coupled and fixed thereto and can be arranged in a line on the inner side of the front holder body 511. The front coupling plates 512 can be spaced apart from each other at a predetermined/selected distance and can be arranged left and right at the inner side of the front holder member 510. This can be to allow the spring members 530 to be extended and restored without interfering with the corrugated pipe 300 and, at the same time, to allow the spring members 530 to be extended and restored without interfering with each other.

Each of the front coupling plates 512 can be provided with a front spring latch 513 to which the front end portion of each of the spring members 530 is latched to be engaged. The front spring latch 513 can be provided to protrude from one surface of each of the front coupling plates 512.

The rear holder member 520 can be coupled between the back duct 200 and the corrugated pipe 300. In other words, the rear holder member 520 can be coupled to the front end portion of the back duct 200 and the rear end portion of the corrugated pipe 300. The corrugated pipe 300 has the rear portion, in the longitudinal direction, which is a structure bent upward that can be connected between the cushion duct 100 and the back duct 200, so the rear end portion of the corrugated pipe 300 can also be referred to as the upper side end portion of the corrugated pipe 300.

Specifically, the rear holder member 520 can include a rear holder body 521 and at least two rear coupling plates 522 spaced apart from each other at an inner side of the rear holder body 521.

The rear holder body 521 can be provided with a hollow pipe structure that is airtightly connected between the front end portion of the back duct 200 and the rear end portion of the corrugated pipe 300. The rear holder body 521 can be provided, at the rear end portion thereof, with a back duct locking protrusion 524 that can be assembled and fixed to the front end portion of the back duct 200. In addition, the rear holder body 521 can be provided, at the front end portion thereof, with a rear corrugated pipe locking protrusion 525, which can be assembled and fixed to the rear end portion of the corrugated pipe 300.

The rear coupling plates 522 can be provided with longitudinal end portions (that is, rear end portions) of the spring members 530 assembled and fixed thereto and arranged in a line on the inner side of the rear holder body 511. The rear coupling plates 522 can be spaced apart from each other at a predetermined/selected distance and arranged left and right at the inner side of the rear holder member 520. This can be to allow the spring members 530 to be extended and restored without interfering with the corrugated pipe 300 and, at the same time, to allow the spring members 530 to be extended and restored without interfering with each other.

Each of the rear coupling plates 522 can be provided with a rear spring latch 523 to which the rear end portion of each of the spring members 530 can be latched to be engaged. The rear spring latch 523 can be provided to protrude from one surface of each of the rear coupling plates 522.

The spring members 530 can be connected between the front holder member 510 and the rear holder member 520 and spaced apart from each other in the inner space of the corrugated pipe 300 through the front holder member 510 and the rear holder member 520. In addition, the spring members 530 can extend and contract integrally with the corrugated pipe 300 through the front holder member 510 and the rear holder member 520. As shown in FIG. 4, when the corrugated pipe 300 is extended, the spring members 530 are also extended, and the elastic restoring force thereof is generated and increased.

As one example, the spring members 530 can be in a state of not being extended, when the seatback 20 is in a basic state of not being rotated forward or backward. As another example, the spring members 530 can be in a state of not being extended, when the seatback 20 is bent backward by a predetermined/selected/maximum angle. In this case, the spring members 530 can be constantly extended in the basic state of the seatback 20.

The elastic support unit 500 can be configured to prevent the corrugated pipe 300 from being abnormally contracted by pulling opposite end portions of the corrugated pipe 300 towards the center when the back duct 200 returns to its original position (or basic position). When the seatback 20 is unfolded, that is, when the seatback 20 is rotated backward and returns to its original position, the back duct 200 moves together with the seatback 20 and returns to its original position.

As shown in FIG. 5, the elastic support unit 500 can be configured to pull the opposite end portions of the corrugated pipe 300 towards the central portion by the elastic restoring force of the spring members 530. The spring members 530 can be configured to pull the opposite end portions of the corrugated pipe 300, but in reality, the corrugated pipe 300 can be contracted while its rear end portion is pulled toward its front end portion. This is because the seat cushion 10 can be in a state of being fixed to the vehicle body when the seatback 20 rotates.

Abnormal contraction of the corrugated pipe 300 can be prevented by assisting the contraction and restoration of the corrugated pipe 300 through the elastic support unit 500 as described above. For example, when the elastic support unit 500 is not applied, the contraction and restoration of the corrugated pipe 300 can be delayed, and at this time, a phenomenon in which the central portion in the longitudinal direction of the corrugated pipe 300 sags downward can occur, or a phenomenon in which the corrugated pipe 300 is bent while sagging can occur. When the elastic support unit 500 is applied, the corrugated pipe 300 can be restored along the same or similar trajectory as when it was extended, and normal restoration is possible without sagging or deflection or bending.

Being applied together with the elastic support unit 500, the corrugated pipe 300 can be allowed to have a stable and normal operation in spite of being configured long according to the amount of rotation of the seatback 20.

The ventilation duct device of an embodiment of the present disclosure configured as described above can use the corrugated pipe 300 having a variable length and the elastic support unit 500 that assists the operation of the corrugated pipe 300, thereby allowing a connection state of the cushion duct 100 and the back duct 200 to be stably maintained even when the seatback 20 rotates. Therefore, the ventilation duct device of an embodiment of the present disclosure can be applied to folding seats even without adding a separate blower to the seatback 20, and cost reduction is possible according to the reduction of the number of blowers.

In addition, the ventilation duct device of an embodiment of the present disclosure can improve the comfort performance of the seatback 20 as a blower for the seatback need not be applied, and the cooling performance of the seatback 20 can be increased as cool air is supplied to the seatback 20 through the blower 400 mounted on the seat cushion 10.

Having described embodiments of the present disclosure in detail above, the terms or words used in the present specification and claims should not be construed as being necessarily limited to common or dictionary meanings, and in addition, the scope of the present disclosure is not necessarily limited to the above-described embodiments, and various modifications and improvements of those skilled in the art using the basic concepts of the present disclosure defined in the following claims can be also included in the scope of the present disclosure.

What is claimed is:

1. A ventilation duct device for a vehicle seat, the device comprising:
   a cushion duct including a blower at a central portion thereof and including a front end portion configured to couple to a seat cushion of the vehicle seat to transfer air supplied through the blower to the seat cushion;
   a back duct coupled to a rear end portion of the cushion duct, the back duct being configured to couple to a seatback of the vehicle seat to supply air transferred through the rear end portion of the cushion duct to the seatback;
   a corrugated pipe configured to be extendable and restorable between the rear end portion of the cushion duct and the back duct to couple the cushion duct and the back duct, the corrugated pipe being configured to allow air to be able to be communicated therewith between the cushion duct and the back duct; and
   an elastic support unit coupling the corrugated pipe to the cushion duct and the back duct, the elastic support unit being configured to assist in restoring the corrugated pipe to a contracted state by an elastic restoring force of the elastic support unit.

2. The device of claim 1, wherein the elastic support unit comprises:
   a front holder member coupled between the cushion duct and the corrugated pipe;
   a rear holder member coupled between the back duct and the corrugated pipe; and
   a plurality of spring members connected between the front holder member and the rear holder member and located in an inner space of the corrugated pipe.

3. The device of claim 2, wherein the front holder member comprises:
- a front holder body coupled between the rear end portion of the cushion duct and a front end portion of the corrugated pipe; and
- a plurality of front coupling plates provided spaced apart from each other inside the front holder body and respectively coupled to front end portions of the spring members.

4. The device of claim 3, wherein the front holder body comprises, at a front end portion thereof, a cushion duct locking protrusion configured to couple with the rear end portion of the cushion duct, and, at a rear end portion thereof, a front corrugated tube locking protrusion configured to couple to the front end portion of the corrugated pipe.

5. The device of claim 3, wherein the front coupling plates comprise front spring latches to which the front end portions of the spring members are respectively coupled.

6. The device of claim 2, wherein the rear holder member comprises:
- a rear holder body coupled between a front end portion of the back duct and a rear end portion of the corrugated pipe; and
- a plurality of rear coupling plates spaced apart from each other inside the rear holder body and respectively coupled to rear end portions of the spring members.

7. The device of claim 6, wherein the rear holder body comprises, at a rear end portion thereof, with a back duct locking protrusion configured to couple to the front end portion of the back duct, and, at a front end portion thereof, a rear corrugated pipe locking protrusion, which is configured to couple to the rear end portion of the corrugated pipe.

8. The device of claim 6, wherein the rear coupling plates comprise rear spring latches to which the rear end portions of the spring members are respectively coupled.

9. A ventilation duct device for a vehicle seat, the device comprising:
- a cushion duct including a front end portion configured to couple to a seat cushion of the vehicle seat to transfer air supplied through a blower to the seat cushion, wherein the cushion duct includes a rear end portion, and wherein the blower is coupled to the cushion duct, the blower being configured to provide air flow into the front end portion of the cushion duct and into the rear end portion of the cushion duct;
- a back duct configured to couple to a seatback of the vehicle seat to supply air transferred through the back duct to the seatback;
- a corrugated pipe configured to be extendable and restorable between the rear end portion of the cushion duct and the back duct to couple the cushion duct and the back duct, the corrugated pipe being configured to allow air to be able to be communicated therewith between the cushion duct and the back duct; and
- an elastic support unit coupling the corrugated pipe to the cushion duct and the back duct, the elastic support unit being configured to assist in restoring the corrugated pipe by elastic restoring force of the elastic support unit,
  wherein the elastic support unit comprises
    - a front holder member coupled between the cushion duct and the corrugated pipe, wherein the front holder member comprises a front holder body coupled between the rear end portion of the cushion duct and a front end portion of the corrugated pipe,
    - a rear holder member coupled between the back duct and the corrugated pipe, wherein the rear holder member comprises a rear holder body coupled between a front end portion of the back duct and a rear end portion of the corrugated pipe, and
    - a plurality of spring members connected between the front holder member and the rear holder member and located in an inner space of the corrugated pipe,
    wherein the front holder member comprises a plurality of front coupling plates provided spaced apart from each other inside the front holder body and respectively coupled to front end portions of the spring members,
    wherein the front coupling plates comprise front spring latches to which the front end portions of the spring members are respectively coupled,
    wherein the rear holder member comprises a plurality of rear coupling plates spaced apart from each other inside the rear holder body and respectively coupled to rear end portions of the spring members, and
    wherein the rear coupling plates comprise rear spring latches to which the rear end portions of the spring members are respectively coupled.

10. The device of claim 9, wherein the front holder body comprises, at a front end portion thereof, a cushion duct locking protrusion configured to couple with the rear end portion of the cushion duct, and, at a rear end portion thereof, a front corrugated tube locking protrusion configured to couple to the front end portion of the corrugated pipe.

11. The device of claim 10, wherein the rear holder body comprises, at a rear end portion thereof, with a back duct locking protrusion configured to couple to the front end portion of the back duct, and, at a front end portion thereof, a rear corrugated pipe locking protrusion, which is configured to couple to the rear end portion of the corrugated pipe.

12. A ventilation duct device for a vehicle seat, the device comprising:
- a cushion duct;
- a blower coupled to the cushion duct and configured to allow air exiting the blower to enter the cushion duct;
- a back duct;
- a corrugated pipe configured to allow the air exiting the blower to enter the back duct via the corrugated pipe;
- an elastic support unit coupled to and at least partially located within the corrugated pipe;
- a first end of the elastic support unit coupled to the cushion duct;
- a second end of the elastic support unit coupled to the back duct; and
- a spring member coupled between the first end of the elastic support unit and the second end of the elastic support unit, and the spring member being at least partially located within the corrugated pipe.

13. The device of claim 12, wherein the first end of the elastic support unit comprises a first coupling plate having a first latch member extending therefrom, wherein the spring member is coupled to the first end via the first latch member.

14. The device of claim 13, wherein the second end of the elastic support unit comprises a second coupling plate having a second latch member extending therefrom, wherein the spring member is coupled to the second end via the second latch member.

* * * * *